Feb. 5, 1946. A. A. GASSNER 2,394,162
AIRPLANE WING STRUCTURE AND METHOD OF MAKING THE SAME
Filed April 29, 1941 2 Sheets-Sheet 2
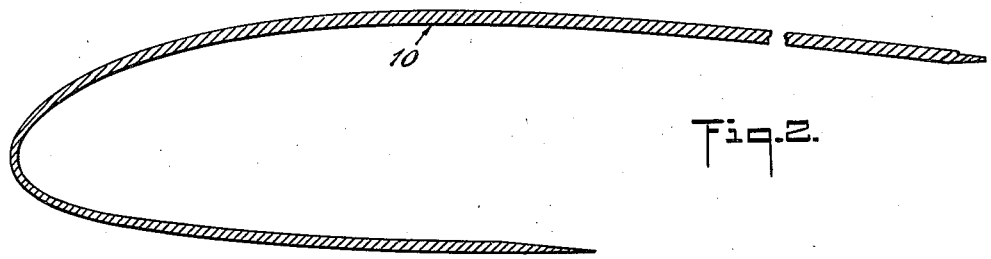
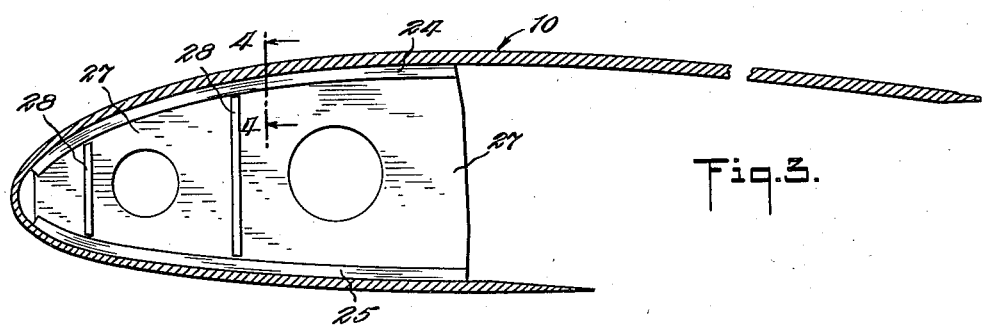
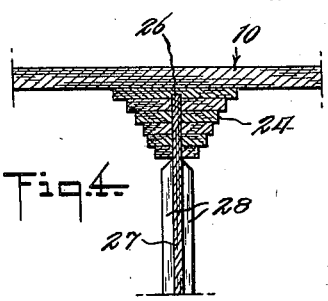
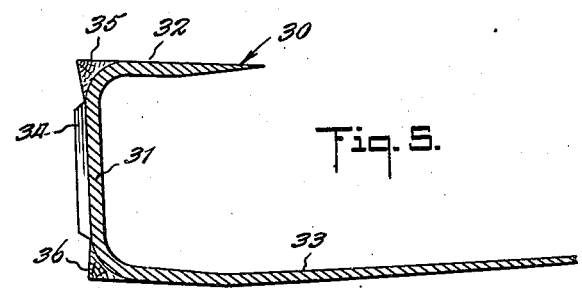
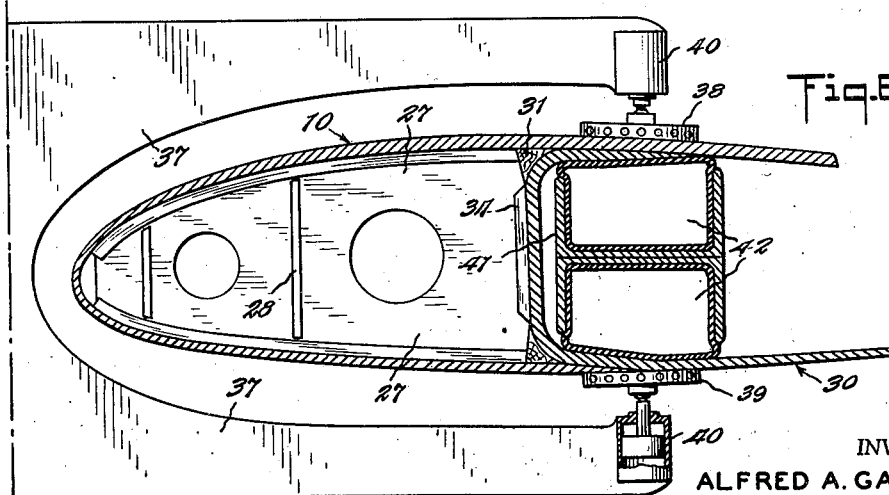
INVENTOR.
ALFRED A. GASSNER Patented Feb. 5, 1946

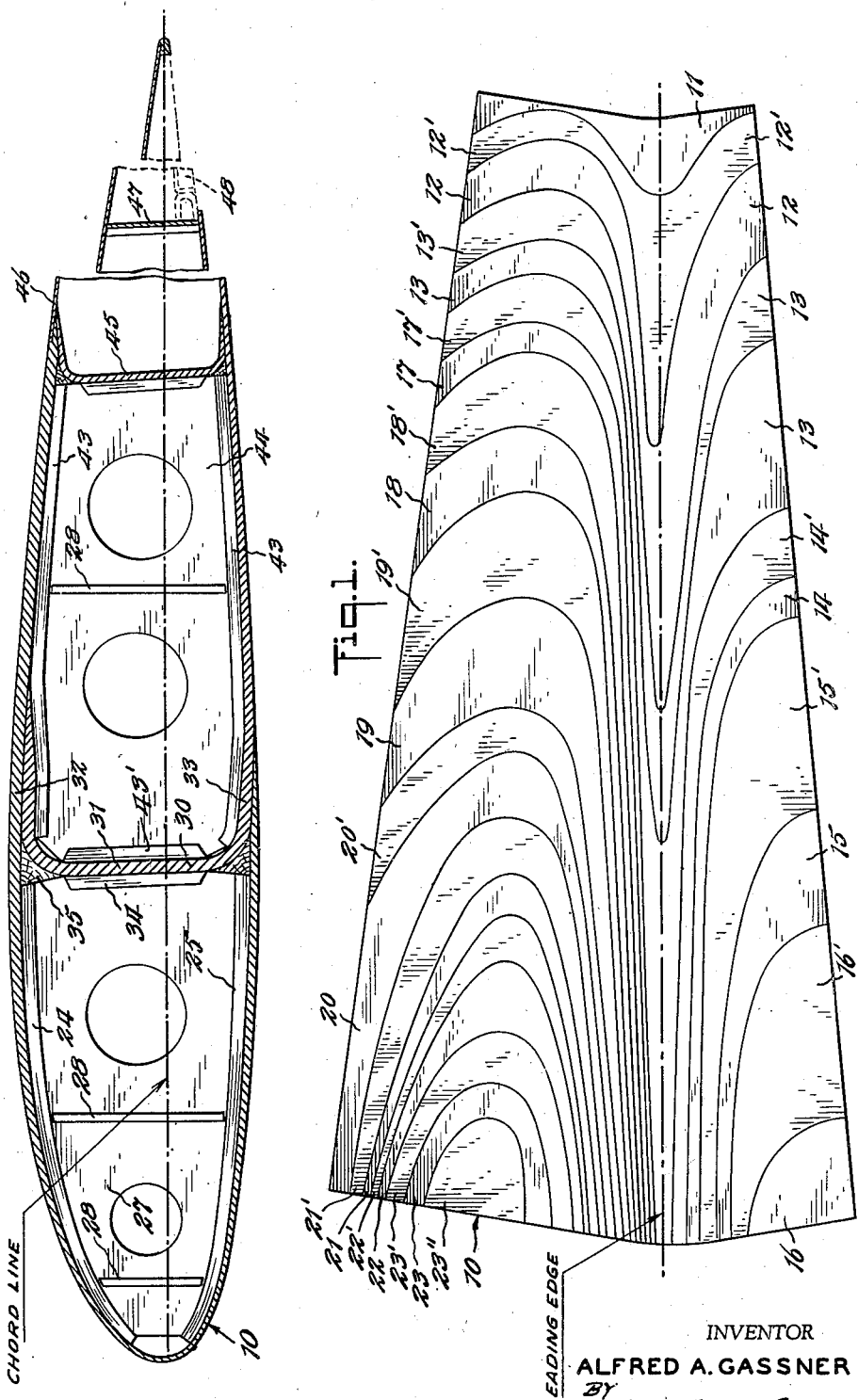

2,394,162

UNITED STATES PATENT OFFICE 2,394,162

AIRPLANE WING STRUCTURE AND METHOD OF MAKING THE SAME

Alfred A. Gassner, New York, N. Y., assignor, by mesne assignments, to William B. Scarborough, Englewood, N. J., as trustee Application April 29, 1941, Serial No. 390,895

10 Claims. (Cl. 244—123)

This invention relates to airplane wing structures and methods of making the same, and has particular reference to the manufacture of multiple-ply airplane wings and similarly-constructed airplane parts, such as ailerons, flaps, elevators, rudders, and the like.

The construction of airplane wings and the like of multiple plies of sheet material, such as wood bonded together with thermo-setting adhesive, enables the apportionment of load-sustaining material throughout the wing in accordance with the stresses to which the wing is subjected in flight without the use of rivets and other separate fastening members. A wing so constructed is light and strong, and may be rapidly formed to the end that aircraft production is expedited. The construction of wings and the like of plywood or equivalent material nevertheless presents numerous construction problems, for owing to the nature of the material used, it must be assembled in layers or plies, which must be bonded into a rigid and substantially homogeneous structure under conditions such that there are no voids between the plies, which are difficult to ascertain after bonding, and there must be no unusual stresses set up within the material during manufacture which might lead to subsequent failure. This is particularly so where large wings having substantial surface areas are required because the expanse of the material which must be used renders proper assembling and effective bonding extremity difficult and often uncertain.

In accordance with this invention, a multiple-ply aircraft wing structure and method of making the same are provided which enables the construction of large wings and other parts of superior strength with the same facility as small wings and other parts may be constructed, without sacrifice of light weight and without complication of the construction process. The method of this invention also enables proper apportionment of the plies in accordance with the load requirements of the wing so that the strain is distributed over the whole surface of the wing and thus a true stressed skin wing is provided.

The invention comprises assembling wood plies, preferably with the grains of successive plies running at an angle to each other, and conforming them to predetermined contour by means of a die of proper configuration, so that, in case of a nose piece for a wing, for example, it has a generally J-shaped cross-section with the curve of the J of this section constituting the nose or leading edge of the wing, and the long arm thereof the top surface of the wing. So assembled and shaped, the plies are bonded together by means of a suitable adhesive, preferably thermosetting adhesive interposed between or applied to the plies before they are assembled in the manner described, heat and pressure being utilized in bonding so that the plies form a self-sustaining unit of the configuration described.

This front shell is then fitted with chordwise cap strips which are arranged in pairs opposite each other on the upper and lower inner surfaces at spaced intervals lengthwise of the shell and are bonded thereto. After these opposite cap strips have been so applied to the shell, they are grooved longitudinally, i. e., chordwise of the shell, and thin pre-shaped chordwise webs of plywood or other material are fitted in the grooves of each pair of opposite cap strips and secured in place by suitable adhesive, or the like.

After assembly of the nose shell in the manner described, a rear shell of similar J-shaped cross-section is formed in the same way and is inserted part way into the nose shell, but in inverted position with respect thereto, so that the long arm of the rear section becomes a complement of the lower surface of the wing and the short arm thereof lies against the under side of the long arm of the nose shell. In this position the two shells are bonded together under heat and pressure by means of thermosetting adhesive, so that the two oppositely arranged shells form the upper and lower surfaces of the wing section. Transverse or chordwise cap strips are bonded to the upper and lower inner surfaces of the rear shell, routed or grooved, and fitted with transverse plates or webs in the manner previously described. Depending upon the desired width of the wing, additional rear shells of the same or similar J-shaped section may be successively bonded to the aforementioned rear or second shell in the same way that the latter was bonded to the front or nose shell. Whether one or more rear shells are employed, a false or rear spar of U-shaped cross-section is inserted to complete the wing section, this false spar being placed just within the trailing edge of the wing and serving as a support for ailerons, flaps, or the like.

It will be seen that the airplane wing structure of this invention and the method of producing the same provide a very simple and effective multiple-ply wing of any desired size, this wing having great strength without sacrifice of lightness and without requiring the use of separate spanwise spars or girders, since the vertical webs of the second or rear shell or shells act as shear webs or spars, and no interior bracing is needed, as the wing structure so formed is strong in tension and compression, and mixed tension and compression, such as torsion.

For a more complete understanding of the invention, reference may be had to the accompanying drawings, in which:

Figure 1 is a development of the nose or front shell of an airplane wing constructed according to this invention and showing the arrangement of the superposed plies;

Fig. 2 is a transverse section of the nose or front shell after the plies have been bonded together;

Fig. 3 illustrates the shell equipped with opposite transverse cap strips on its upper and lower inner surfaces;

Fig. 4 is an enlarged transverse section as seen along the line 4—4 of Fig. 3, showing the construction of one of the cap strips after it has been grooved or routed to provide for the chordwise webs or stringers;

Fig. 5 is a transverse section through the second or rear shell;

Fig. 6 illustrates the manner of assembling the nose and rear shells and the apparatus for effecting the bonding operation; and Fig. 7 illustrates the completed wing section as seen at the root end.

Referring to Fig. 1 of the drawings, numeral 10 designates the nose shell which is shown in Fig. 1 as in developed form. The shell consists of a series of layers or plies of wood in superposed relation, each, except the small ones, comprising a series of edge-glued strips and cut out to prescribed shape in accordance with the contour of templets. These layers or plies are laid one upon the other in the proper relationships shown in Fig. 1, with sheets of dry thermo-setting adhesive such as a phenol, urea, or similar synthetic resin, interposed between them. In the alternative arrangement, a water-dispersion of a thermosetting resin may be applied to the abutting surfaces of the plies or layers and the whole dried to the proper water content.

As shown in Fig. 1, the surface ply 11 is a large sheet, preferably consisting of three plies with the grain of the outer plies running spanwise of the wing and the grain of the intermediate ply, not shown, running chordwise of the wing, whose leading edge is indicated by the reference line bearing that legend. Alternate plies 12, 13, 14, 15 and 16, as seen along the lower edge of the development of Fig. 1, and additional plies 17 to 23, inclusive, as seen along the upper half of the development, are also arranged with their grains running lengthwise of the wing. The remaining alternate plies, 12' to 23' and 23", preferably have their grains running transversely or chordwise of the wing, although certain of the spanwise grain plies may be substituted by chordwise grain plies at the nose or leading edge, for example, as is explained in my Patent No. 2,315,324 granted March 30, 1943.

The size and apportionment of these several plies depends upon the load requirements of the wing, and Fig. 1 illustrates a typical arrangement, which, however, is subject to such variation as may be necessary for each wing design. In the arrangement shown, the plies or layers are so shaped and positioned that the wall of the wing section increases progressively in thickness rearwardly from the leading edge to the mid-section or neutral axis, and then decreases slightly in thickness. Thus, at the root of the wing, the wall of the wing at the leading edge or nose is seven plies thick, and may be twenty-two plies thick at the mid-section of the upper surface. It will be observed that plies 12', 12, 13' and 13 are each provided with a deep indentation at their wing tip ends, which extends along the leading edge of the wing, so that the thickness of the wall at the leading edge of the wing decreases progressively from root to tip, viz., seven to three plies in the illustrated case.

In this manner, the thickness of the wall of the wing may be provided where needed, to the end that a wing so arranged provides the true stressed skin effect, with the load distributed evenly over its entire surface, so that the stress curve follows the contour of the wing substantially without the peaks or valleys which are characteristic of the stress curves of wings having one or more spars taking all or most of the load.

These plies with their edges scarfed to overlap smoothly, are assembled, with the thermosetting adhesive interposed between them, in a female die having the proper airfoil configuration, and are pressed against the interior of the die by means of fluid pressure, such as air under pressure applied against the surface of a rubber blanket sealed along the edges of the die beyond the edges of the plywood assembly. Further details of the construction of the die and the method of forming curved shells are disclosed in the patent to J. H. Potchen and O. H. Basquin, No. 2,308,453, granted January 12, 1943.

Heat is simultaneously applied to the plywood assembly, so that the adhesive is fused and impregnates the fibres of the wood and bonds the adjacent layers together to form the J-shaped nose or front shell shown in Fig. 2, which has the spanwise length shown in Fig. 1. The transverse or chordwise width of the long leg of the self-sustaining shell 10 is preferably the entire width of the top of the completed wing, and serves as the continuous chordwise base of the wing, as will be shown.

Molded cap strips 24 and 25, constituting superimposed layers of decreasing width of plywood bonded together, are applied opposite each other on the upper and lower inner surfaces of the nose shell 10 and bonded thereto by suitable adhesive, the structure of the cap strip assembly thus formed being shown in Fig. 4. After application to the interior of the nose shell 10, the cap strips are grooved or routed to provide the longitudinal slot 26 in each of the opposite cap strips 24 and 25, so that the grooves 26 lie in the same plane.

After formation of the grooves 26, chordwise webs 27 are inserted in the grooves and secured to the cap strips 24 and 25 by suitable adhesive or the like. The webs 27 are of thin material such as plywood, and extend short of the lower or shorter leg of the J-shaped nose shell 10, as shown in Fig. 3. The number and spacing of the webs 27 depends upon the size of the wing and the load to which it is to be subjected. Thus they may be spaced approximately fifteen inches apart spanwise of the shell 10. The webs 27, being thin, may be stiffened laterally by means of one or more vertical ribs 28, which are secured thereto by adhesive or the like, and the webs 27 may be provided with holes for reducing weight, or affording passage of control cables, rods, or the like, as shown in Fig. 3.

The second or rear shell 30 shown in Fig. 5 is then formed in precisely the same way as the nose or front shell 10 was formed, and generally the same J-shaped section but having its front or vertical end 31 substantially straight between the short and long legs 32 and 33, respectively, so as to form a spanwise shear web for the complete wing. As in the case of the nose shell 10, the plies forming the second shell 30 are arranged in accordance with the strength requirements of the wing, the horizontal upper and lower legs 32 and 33 thereof being of a thickness commensurate with that of the corresponding portions of the nose shell, as is indicated in Fig. 7.

The second or rear shell 30 is adapted to be associated with the front shell 10 in inverted position, i. e., with the long leg 33 below and opposite the long leg of the front shell. Prior to joining the front and rear or second shells in the manner described, corner blocks 35 and 36 are bonded along the upper and lower outer corners, respectively, of the rear shell 30 and are shaped so as to fit closely within the front shell when the rear shell is inserted part way into the front shell in the manner shown in Fig. 6. The edge of the lower leg of the nose shell 10 is bevelled so that the joint between it and the corresponding surface of the rear shell 30 is smooth and firm, and thermosetting adhesive is interposed between the abutting surfaces of the front and rear shells. A strip 34 similar in all respects to cap strips 24 and 25, including a groove for receiving the rear edge of the web 27, is also bonded to the vertical web 31 of the second shell 30.

The two shells 10 and 30 so assembled are inserted in a large C-shaped clamp or frame 37 and steam-heated platens 38 and 39 applied against the upper and lower outer surfaces of the assembly opposite the joints between the front and rear shells in the manner shown in Fig. 6, these platens being suitably advanced and retarded by hydraulic pressure within cylinders 40 or by screws or the like, depending upon requirements. Inserted within the rear shell 30, opposite the joint between the two shells, is an H-shaped jig 41 containing upper and lower expansible chambers or bags of rubber or the like, which when inflated, force the shells together at the joints between them, so that they are clamped between the heated platens 38 and 39 and the corresponding bags 42. The thermosetting adhesive softens and bonds the adjacent shells securely and permanently together in the relationship shown.

After thus joining the front and rear shells 10 and 30, the edge of the short arm 32 of the rear shell is scarfed and smoothed, so as to form a continuous surface with the corresponding extension of the upper arm of the nose shell 10. Then cap strips 43 like or similar to cap strips 24 and 25 are applied to the upper and lower surfaces of the rear shell at suitably spaced points. A similar strip 43' is applied to the rear wall of the vertical web 31, in the same plane with strips 43. If desired, the lower cap strips 43 and vertical strips 43' may be applied to the rear shell 30 before the latter is joined to the front shell 10, but the upper cap strips 43 may not be applied previously to joining of the shells, because they overlap the front shell 10 and serve to strengthen the joint between the shells. These cap strips 43 and vertical strips 43' are then grooved longitudinally, chordwise of the wing, and chordwise webs 44 similar to nose shell webs 27 are inserted in these grooves in strips 43 and 43' in the same way and for the same purpose as nose shell webs 27.

Depending upon the desired width and size of the wing, additional rear shells similar to rear shell 30 and having the desired contour, are applied to rear shell 30 and successively to each other in the same way until the desired width of the wing is attained. Assuming that a wing of a width requiring only one rear shell 30 is desired, the wing section is completed by inserting within the rear shell 30 a U-shaped shell 45 which is constructed and bonded in place within shell 30 in the same way that the latter was constructed and bonded in place within nose shell 10. The extension of the lower or long arm 33 of the rear shell 30 constitutes in this instance the extension of the lower surface of the wing from the vertical shear web 31 to the trailing edge.

In the wing shown in Fig. 7, the upper wing surface is extended beyond the rear edge of the long arm of the nose or front shell 10, this extension being formed by a plywood plate 46 suitably secured to the nose shell rear edge and extending beyond the false spar 47 connecting it to the rear edge of the lower leg of the second shell 30. The false spar 47 may serve as a support for a flap 48, as shown, or other compensating wing parts. Obviously where the wing must be so wide that the length of the long arm of the nose shell becomes excessive and difficult to handle, the rearmost rear shell may be inverted, with its long arm on top so as to form a continuation of the long arm of the front or nose shell. Thus, instead of making shell 45 U-shaped and adding plate 46, the shell 45 may be J-shaped in section like shells 10 or 30, and inverted so that its long arm is on top and forms the extension of the nose shell instead of plate 46. In general, however, only the first and second shells are inverted with respect to each other, whereas, the succeeding shells following the second, are arranged in the same way as the second, that is, with the longer arm below, with the long arm of the nose shell constituting the entire upper surface of the wing.

While a preferred embodiment of the invention has been illustrated and described herein, it is to be understood that the invention is not limited thereto but is susceptible of changes in form and detail within the scope of the appended claims.

I claim:

1. An aircraft wing structure and the like, comprising an elongated shell of substantially J-shaped cross-section arranged with its long leg forming the upper surface of the wing and its short leg forming a portion of the lower surface thereof behind the leading edge, a second shell of substantially J-shaped cross-section, means securing said shells together in partially nested relation with the long leg of said second shell constituting an extension of the short leg of said first shell to form the lower surface of said wing, a third shell of substantially U-shaped cross-section, and means securing said third shell to and between the long legs of said first and second shells at points adjacent the trailing edges thereof.

2. A reinforced skin structure for an airplane wing or the like, comprising two members fabricated of molded wood adhered to each other in interlocking relationship, one member providing wing skin and reinforcing structures, comprising a spanwise shear web, a portion of the bottom wing surface extending from the lower terminus of the web rearwardly to the trailing edge section, and a joining section including a scarfed terminal edge, extending from the upper terminus of the web rearwardly a predetermined distance, the other member providing wing skin structure, comprising the leading edge section, the top wing surface extending from the leading edge section rearwardly to the trailing edge section, and a portion of the bottom wing surface extending from the leading edge section rearwardly to the web of the first member and a predetermined extent beyond which includes a scarfed terminal edge, the scarfed edge of the first member being adhered to the inside of the skin structure of the top wing surface, the scarfed edge of the second section being adhered to the outside of the skin structure of the bottom wing surface near the web of the first member.

3. A reinforced skin structure for an airplane wing or the like, comprising two members fabricated of molded wood adhered to each other in interlocking relationship, one member providing wing skin and reinforcing structures, comprising a spanwise shear web, a portion of the bottom wing surface extending from the lower terminus of the web rearwardly to the trailing edge section, and a joining section including a scarfed terminal edge extending from the upper terminus of the web rearwardly a predetermined distance, the other member providing wing skin structure, comprising the leading edge section, the top wing surface extending from the leading edge section rearwardly to the trailing edge section, and a portion of the bottom wing surface extending from the leading edge section rearwardly to the web of the first member and a predetermined extent beyond which includes a scarfed terminal edge, the scarfed edge of the first member being adhered to the inside of the skin structure of the top wing surface, the scarf of the second member being disposed on the inside of the skin structure of the bottom wing surface directed at an angle to the outside surface thereof, and being adhered to the outside of the skin structure of the bottom wing surface near the web of the first member.

4. A reinforced skin structure for an airplane wing or the like, comprising two members fabricated of molded wood adhered to each other in interlocking relationship, one member providing reinforcing structure comprising a spanwise shear web, the other member providing wing skin structure comprising the leading edge section and top and bottom wing surfaces extending from the leading edge section rearwardly to the web, a set of ribs backing the leading edge section and the top and bottom wing surfaces, the shear web joining the insides of the top and bottom wing surfaces and engaging the ribs to hold them located in position.

5. A reinforced skin structure for an airplane wing or the like, comprising two members fabricated of molded wood, one member providing wing skin and reinforcing structures, comprising a spanwise shear web, and a portion of the bottom wing surface extending from the web rearwardly to the trailing edge section, the other member providing wing skin structure, comprising the leading section, the top surface of the wing extending from the leading edge section rearwardly to the trailing edge section, and a portion of the bottom wing surface extending from the leading edge section rearwardly to the web of the first member, a set of ribs backing the leading edge section and the top and bottom wing surfaces forwardly of the web of the first member, the inside of the skin structure of the bottom wing surface of the second member being adhered to the outside surface of the first member near the web, the web of the first member being attached by adhesion to the inside of the skin structure of the top wing surface to position the web to hold the ribs located in position, a second set of ribs backing the web and the top and bottom wing surfaces rearwardly thereof, a U-shaped member adhered to the insides of the top and bottom wing surfaces at the trailing edge section and holding the second set of ribs located in position.

6. In an airplane wing construction as defined in claim 4, cap strips molded and adhered to the inside surface of the skin structure in positions severally to locate the respective ribs, each cap strip comprising a plurality of laminae of wood or the like material, a slot disposed longitudinally of each strip and extending through the laminae to a predetermined depth, each slot being of a width to receive the thickness of the rib and extending to a depth to hold the rib firmly seated in proper location.

7. A reinforced skin structure for an airfoil having a top and a bottom surface, the structure comprising two members of substantially J-shaped cross section attached to each other in interlocking relationship, the one member forming a spanwise shear web with its portion joining the legs of the J, and forming a portion of one airfoil surface with the longer leg of the J extending from the web towards the trailing edge of the airfoil; the other member forming the leading edge of the airfoil with its portion joining the legs of the J, forming the other airfoil surface with the longer leg of the J extending from the leading edge rearwardly towards the trailing edge, and forming a forward portion of the one airfoil surface with the shorter leg of the J extending from the leading edge to the web formed by the first member.

8. A reinforced skin structure for an airplane wing or the like, comprising two members of substantially J-shaped cross section fabricated of molded material and adhered to each other in interlocking relationship, the one member forming a spanwise shear web with its portion joining the legs of the J, and forming a portion of the bottom wing surface with the longer leg of the J extending from the web rearwardly towards the trailing edge of the wing; the other member forming the leading edge of the wing with its portion joining the legs of the J, forming the top wing surface with the longer leg of the J extending from the leading edge rearwardly towards the trailing edge, and forming a forward portion of the bottom surface of the wing with the shorter leg of the J extending from the leading edge rearwardly to the web formed by the first member.

9. The method of constructing a reinforced airfoil from members of molded material, the method comprising, fabricating a first member comprising a leading edge section and top and bottom skin sections extending rearwardly from the leading edge section; fabricating a second member comprising a shear web section and top and bottom flange sections extending rearwardly from the shear web section; applying adhesive to surfaces of contact between said members; placing said second member between the top and bottom skin sections of said first member with the flange sections extending away from the leading edge sections so as to leave a substantially U-shaped space between the flange sections; placing a rigid die member against the outside surfaces of the top and bottom skin sections overlying said flange sections; and applying fluid pressure in the U-shaped space against the inside surfaces of the flange sections whereby the flange sections are forced outwardly into adhesive engagement with the said top and bottom skin sections, the final contour of the outside surfaces of the top and bottom skin sections being determined by the contour of said die members resting thereagainst.

10. A structural element for a composite airfoil of molded material having a top and a bottom airfoil surface, said element being of substantially J-shaped cross section and comprising a short leg having a scarfed rearward edge adapted to be adhesively secured to the inside of one surface of the airfoil, a long leg forming a portion of the other surface of the airfoil extending towards the trailing edge of the airfoil, and a connecting portion connecting the short and the long leg of the element, the connecting portion being integral with said legs, substantially straight and extending at substantially right angles with respect to said legs so as to form a spanwisely extending shear web for the airfoil.

ALFRED A. GASSNER.